United States Patent
Oyama

(10) Patent No.: US 10,322,689 B1
(45) Date of Patent: Jun. 18, 2019

(54) BATTERY CARRIER

(71) Applicant: TOYOTA JIDOSHA KABUSHIKI KAISHA, Toyota-shi, Aichi-ken (JP)

(72) Inventor: Masashi Oyama, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/199,794

(22) Filed: Nov. 26, 2018

(30) Foreign Application Priority Data

Dec. 1, 2017 (JP) ................... 2017-232045

(51) Int. Cl.
| | |
|---|---|
| *B60K 1/04* | (2019.01) |
| *B60R 16/04* | (2006.01) |
| *H01M 2/10* | (2006.01) |
| *B60L 11/18* | (2006.01) |
| *B60K 6/28* | (2007.10) |

(52) U.S. Cl.
CPC .......... *B60R 16/04* (2013.01); *B60L 11/1879* (2013.01); *H01M 2/1005* (2013.01); *H01M 2/1083* (2013.01); *B60K 6/28* (2013.01); *H01M 2220/20* (2013.01)

(58) Field of Classification Search
CPC .................................. B60K 6/28; B60K 1/04
USPC ....................................................... 180/68.5
See application file for complete search history.

(56) References Cited

U.S. PATENT DOCUMENTS

| | | | | |
|---|---|---|---|---|
| 2,947,373 | A | * | 8/1960 | Wilson .................... B60R 16/04 180/68.5 |
| 3,557,895 | A | * | 1/1971 | Thomas ................... B60R 16/04 180/68.5 |
| 3,834,479 | A | * | 9/1974 | Bowers .................... B60R 16/04 180/68.5 |
| 3,866,704 | A | * | 2/1975 | Bowers .................... B60R 16/04 180/68.5 |
| 3,894,607 | A | * | 7/1975 | Brock ..................... B60R 16/04 180/68.5 |
| 4,098,366 | A | * | 7/1978 | Reinhard ................. B60R 16/04 180/68.5 |
| 4,444,853 | A | * | 4/1984 | Halsall ...................... G03F 1/90 429/177 |
| 4,535,863 | A | * | 8/1985 | Becker ................. H01M 2/1083 180/68.5 |
| 4,632,201 | A | * | 12/1986 | Kay ......................... E05C 3/16 180/68.5 |
| 4,754,827 | A | * | 7/1988 | Hirabayashi ............ B60R 16/04 180/68.5 |

(Continued)

FOREIGN PATENT DOCUMENTS

JP 2017-114221 A 6/2017

*Primary Examiner* — Jeffrey J Restifo
(74) *Attorney, Agent, or Firm* — Oliff PLC

(57) ABSTRACT

A battery clamp includes a front locking part configured to lock a front face bottom flange formed on a bottom of a front face of a battery. During normal operations, a front pressing portion of the front locking part is in contact with a top face of the front face bottom flange. In a rear crash, upon receiving an upward force from the front face bottom flange, the front locking part moves upward and is tilted rearward to bring a front facing portion into contact with the front face of the battery. Not only the front pressing portion but also the front facing portion holds the battery, so that holding power can be enhanced.

4 Claims, 4 Drawing Sheets

(56) References Cited

U.S. PATENT DOCUMENTS

| | | | | |
|---|---|---|---|---|
| 4,756,978 A * | 7/1988 | Nitcher | H01M 2/1077 | 180/68.5 |
| 4,854,540 A * | 8/1989 | Balek | B60R 16/04 | 248/503 |
| 4,966,346 A * | 10/1990 | Karna | B60R 16/04 | 180/68.5 |
| 5,052,198 A * | 10/1991 | Watts | B60R 16/04 | 180/68.5 |
| D321,856 S * | 11/1991 | Whitley, II | | 180/68.5 |
| 5,082,075 A * | 1/1992 | Karolek | B60R 16/04 | 180/68.2 |
| 5,086,860 A * | 2/1992 | Francis | H01M 2/1083 | 180/68.5 |
| 5,222,711 A * | 6/1993 | Bell | B60R 16/04 | 180/68.5 |
| 5,377,947 A * | 1/1995 | Johnson | B60R 16/04 | 180/68.5 |
| 5,484,667 A * | 1/1996 | Sahli | B60R 16/04 | 180/68.5 |
| 5,543,248 A * | 8/1996 | Dougherty | H01M 2/1072 | 429/100 |
| 5,547,160 A * | 8/1996 | Johnson | B60R 16/04 | 180/68.5 |
| 5,643,693 A * | 7/1997 | Hill | H01M 2/1083 | 429/121 |
| 5,681,668 A * | 10/1997 | Reed | H01M 2/1072 | 180/68.5 |
| 6,161,810 A * | 12/2000 | Crow | H01M 2/1083 | 180/68.5 |
| 6,230,833 B1 * | 5/2001 | Setsuda | B60R 16/04 | 123/184.21 |
| 6,230,834 B1 * | 5/2001 | Van Hout | B60R 16/04 | 180/68.5 |
| 6,290,013 B1 * | 9/2001 | Bienenstein, Jr. | B60R 16/04 | 180/68.5 |
| 6,371,229 B1 * | 4/2002 | Kakiuchi | B60K 5/1208 | 180/291 |
| 6,431,300 B1 * | 8/2002 | Iwase | B60K 1/04 | 180/68.5 |
| 6,564,893 B2 * | 5/2003 | Lipman | B60R 16/04 | 180/68.5 |
| 6,827,168 B2 * | 12/2004 | Miyazaki | B60R 19/00 | 180/274 |
| 6,827,169 B1 * | 12/2004 | Van Hout | B60R 16/04 | 180/68.5 |
| 6,871,829 B2 * | 3/2005 | Shannon, Jr. | A47G 11/002 | 180/68.5 |
| 7,014,002 B2 * | 3/2006 | Mizuta | B60R 16/04 | 180/68.5 |
| 7,331,559 B2 * | 2/2008 | Hirayu | B60R 16/04 | 180/68.5 |
| 7,357,206 B2 * | 4/2008 | Fobean | B60R 16/04 | 180/68.5 |
| 7,384,704 B2 * | 6/2008 | Scott | B60H 1/00278 | 136/204 |
| 7,389,841 B2 * | 6/2008 | Boville | B60R 16/04 | 180/68.5 |
| 7,607,502 B2 * | 10/2009 | Boville | B60R 11/00 | 180/68.5 |
| 7,726,427 B2 * | 6/2010 | Picavet | H01M 2/1083 | 180/68.5 |
| 8,011,467 B2 * | 9/2011 | Asao | B60K 1/04 | 180/68.5 |
| 8,517,131 B2 * | 8/2013 | Kovach | H01M 2/1083 | 180/68.5 |
| 8,808,894 B2 * | 8/2014 | Munro | B60R 16/04 | 429/100 |
| 8,822,056 B2 * | 9/2014 | Brewer | H01M 2/1083 | 180/68.5 |
| 8,893,843 B2 * | 11/2014 | Hayano | B60L 15/007 | 180/232 |
| 8,973,883 B2 * | 3/2015 | Meier | H01M 2/1083 | 180/68.5 |
| 8,978,804 B2 * | 3/2015 | Okada | H01M 2/1072 | 180/68.5 |
| 9,118,060 B2 * | 8/2015 | Oyama | H01M 2/1083 | |
| 9,640,787 B2 * | 5/2017 | Lee | H01M 2/1072 | |
| 9,944,161 B2 * | 4/2018 | Shimasaki | B60K 1/04 | |
| 10,183,637 B2 * | 1/2019 | Uraguchi | B60R 16/04 | |
| 2005/0225283 A1 * | 10/2005 | Boville | B60R 16/04 | 320/107 |
| 2017/0174160 A1 | 6/2017 | Uraguchi et al. | | |

* cited by examiner

BATTERY CARRIER

CROSS REFERENCE TO RELATED APPLICATION

The disclosure of Japanese Patent Application No. 2017-232045 filed on Dec. 1, 2017 including the specification, claims, drawings, and abstract is incorporated herein by reference in its entirety.

TECHNICAL FIELD

The present disclosure relates to a battery carrier for holding a battery that supplies electric power to electrical components, for example, in a vehicle.

BACKGROUND

Vehicles such as automobiles include an auxiliary battery (which will be hereinafter referred to as a "battery") that supplies electric power to electrical components including lights, on-vehicle computers, car audio equipment, and route guidance systems, for example. The battery has a substantially rectangular parallelepiped shape. The battery is placed on a support surface of a tray-like battery carrier and installed in an engine compartment, for example.

Patent Document 1 indicated below discloses a battery carrier for holding a battery (10). The battery (10) includes bottom flanges (ribs 12F, 12B, 12R, 12L) at bottom portions of its four side faces, respectively. The battery (10) is placed on a support surface (25) of a body (23) of the battery carrier, and a back bottom flange (rib 12B) and a right bottom flange (rib 12R) of the battery (10) are respectively held by corresponding holding portions (locking portions 27 and 28) located on a rear edge and a right side edge of the body (23). A front bottom flange (rib 12F) and a left bottom flange (rib 12L) of the battery (10) are further held, at a front-left corner of the battery (10), by a battery clamp (clamping member 22) between the battery clamp and the support surface (25). The names of members and reference numerals described above in parentheses are used in Patent Document 1 and are not relevant to those used in the description of the embodiments of the present application.

CITATION LIST

Patent Literature

[Patent Document 1] JP 2017-114221 A

SUMMARY

Technical Problem

Vehicle crashes induce a force that would remove the battery off from the battery carrier. There are therefore possibilities for modification in the holding power of the battery carrier for holding the battery, especially in the holding power of the battery clamp.

Solution to Problem

The battery carrier in accordance with an aspect of the disclosure is used for mounting a battery having a rectangular parallelepiped shape on a vehicle and holds the battery. More particularly, the battery carrier holds bottom flanges on bottom portions of a front face, a back face, a first side face, and a second side face, respectively, of the battery to hold the battery. The battery carrier includes a carrier base having a support surface of a rectangular shape on which the battery is placed. The carrier base includes holding portions in a rear edge portion and a first side edge portion of the support surface, respectively. The holding portions include holding faces facing the support surface and holding the bottom flanges on the back face and the first side face, respectively, between the holding faces and the support surface. The battery carrier further includes a battery clamp disposed in a corner formed between a front edge portion and a second side edge portion opposite the first side edge portion of the support surface of the carrier base. The battery clamp is fixed on the carrier base at a position further backward from the front face of the battery and beside the second side face of the battery. The battery clamp includes a front locking part located in front of the front face of the battery to lock the bottom flange on the front face, and a side locking part located beside the second side face of the battery to lock the bottom flange on the second side face. The front locking part includes a plate-like front facing portion facing the front face of the battery and a plate-like front pressing portion extending from a lower edge of the front facing portion along a top face of the bottom flange on the front face to contact the top surface of the bottom flange on the front face.

In a rear crash of a vehicle, a force acts on the battery that would cause the battery to be tilted rearward, which would further lift the front edge of the battery upward. With the front edge of the battery, the battery clamp, particularly the front locking part, is also lifted. As the battery clamp is fixed to the battery carrier at a position further backward from the front face of the battery, the front locking part is also lifted, with the battery front edge, toward the rearward tilted direction; the front facing portion comes into contact with the battery front face for holding. As such, not only the front pressing portion but also the front facing portion holds the front edge of the battery that is lifted upward, so that removal of the battery can be prevented.

The front locking part of the battery clamp receives a force, from the rearward tilted battery, that contains primary components in the direction along the plate face of the front facing portion. The battery clamp, including a plate-like front facing portion facing the front face of the battery, has high rigidity against the force received from the rearward tilted battery, which contributes to prevention of removal of the battery.

The side locking part may include a plate-like side facing portion facing the second side face of the battery and a plate-like side pressing portion extending from a lower edge of the side facing portion along a top face of the bottom flange on the second side face to contact the top face of the bottom flange on the second side face. The front facing portion and the side facing portion may be connected to form an L shape.

The battery clamp receives, from the rearward tilted battery, a force containing primary components in the directions along the plate faces of the front facing portion and the side facing portion. Therefore, the portion formed in an L-shape by the front facing portion and the side facing portion has a high rigidity against the force received from the rearward tilted battery. This high rigidity contributes to prevention of removal of the battery.

The front pressing portion and the side pressing portion may be separated from each other. The battery clamp, including the front facing portion and the side facing portion that are connected with each other and the front pressing portion and the side pressing portion that are separated from each other, can be easily produced.

The front facing portion may be configured to be spaced from the front face of the battery in normal times and to be tilted rearward with the rearward tilt of the battery and come into contact with the front face of the battery. The structure of the front facing portion, which is normally spaced from the battery front face, prevents unnecessary force from acting on the battery.

Advantageous Effects of Invention

The battery carrier has an increased holding power for holding the battery in a rear crash of a vehicle.

BRIEF DESCRIPTION OF DRAWINGS

An embodiment of the present disclosure will be described by reference to the following figures, wherein.

DESCRIPTION OF EMBODIMENTS

Figure 1:
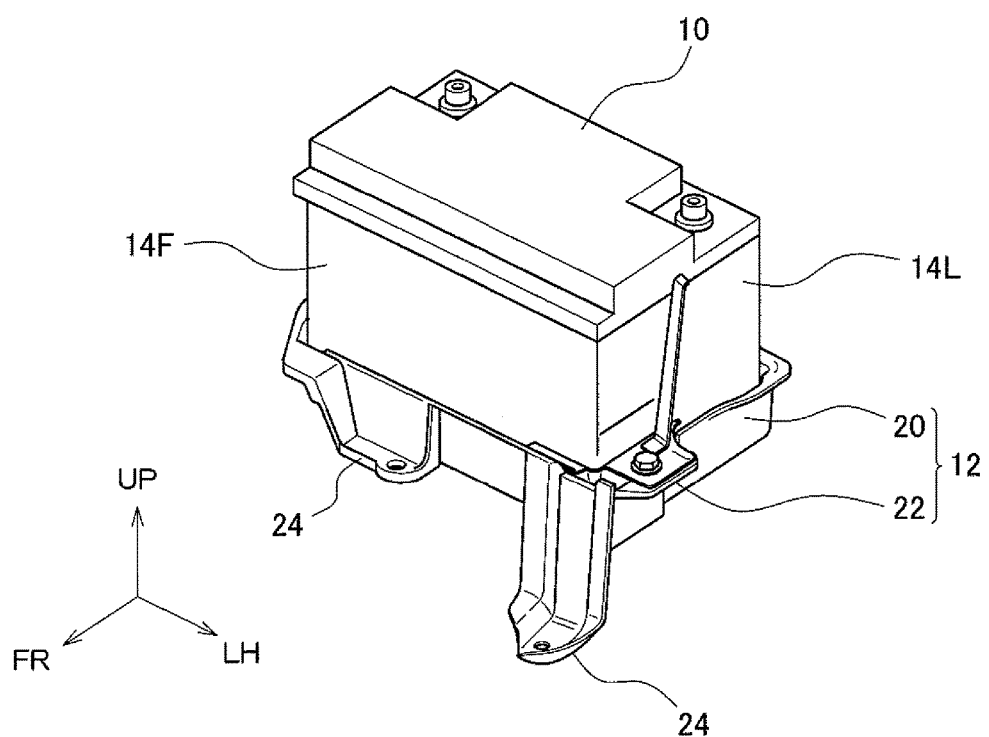
FIG. 1 is a perspective view illustrating a battery carrier according to an embodiment, with a battery mounted thereon.
Figure 2:
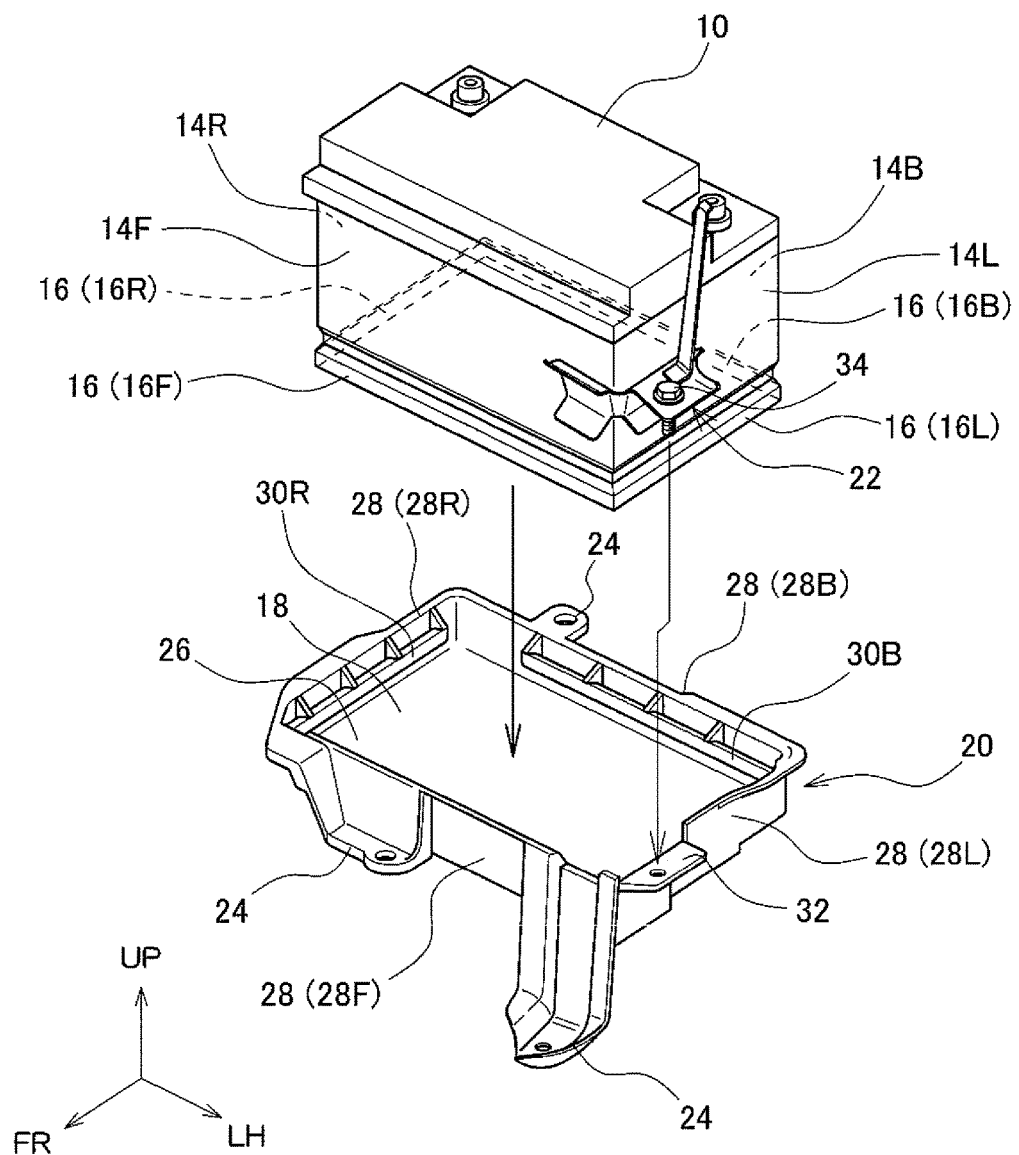
FIG. 2 is an exploded perspective view of the battery and the battery carrier.

An embodiment of the present disclosure will be described with reference to the drawings. FIG. 1 illustrates a battery carrier 12 that holds a battery 10, and FIG. 2 illustrates the battery carrier 12 and the battery 10 which is removed from the battery carrier 12. In the drawings, arrows FR, UP, and LH indicate forward, upward, and leftward of a vehicle, respectively. In the following description, terms describing directions and orientations, such as "forward," "rearward" or "backward," "leftward," "rightward," "upward," and "downward," refer to directions and orientations with respect to a vehicle, unless otherwise specified.

The battery 10 is disposed in an engine compartment in the front portion of a vehicle. However, the location where the battery 10 is disposed is not limited to the engine compartment, and the battery 10 may be disposed adjacent to a trunk in the rear portion of the vehicle, for example. The battery 10 has a substantially rectangular parallelepiped shape, and, when mounted in a vehicle, has a front face 14F facing forward, a back face 14B facing backward, a right side face 14R facing rightward, and a left side face 14L facing leftward. The battery 10 includes bottom flanges 16 protruding outward around the bottom portion of the battery 10. In the following description, the bottom flange 16 disposed at the lower end; that is, at the bottom, of the front face 14F will be referred to as a front face bottom flange 16F; similarly, the bottom flanges 16 disposed on the back face 14B, the right side face 14R, and the left side face 14L, will be referred to as a back face bottom flange 16B, a right side face bottom flange 16R, and a left side face bottom flange 16L, respectively.

The battery carrier 12 includes a carrier base 20 of a tray shape including a support surface 18 on which the battery 10 is placed, and a battery clamp 22 configured to be fixed to the carrier base 20 to hold the battery 10 in cooperation with the carrier base 20.

The carrier base 20 includes three attachment legs 24 each having a bolt hole. The battery carrier 12 is fastened to a body of a vehicle by fastening the attachment legs 24 with bolts (not shown). The carrier base 20 includes a bottom plate 26 defining the support surface 18, and surrounding walls 28 disposed to surround the support surface 18. In the following description, the surrounding wall 28 located at the front edge of the support surface 18 will be referred to as a front wall 28F; similarly, the surrounding walls 28 located at the back edge, the right edge, and the left edge of the support surface 18 will be referred to as a back wall 28B, a right side wall 28R, and a left side wall 28L, respectively.

The back wall 28B and the right side wall 28R include a back face protruding portion 30B and a right side face protruding portion 30R protruding inward, respectively. In contrast, the front wall 28F and the left side wall 28L include no such protruding portions corresponding to the back face protruding portion 30B and the right side face protruding portion 30R.

The back face protruding portion 30B extends in the leftward-rightward direction along an inner wall face of the back wall 28B. The back face protruding portion 30B may be disposed along the entire length of the back wall 28B or along a portion of the back wall 28B. The back face protruding portion 30B includes an undersurface facing the support surface 18. When the battery 10 is mounted on the carrier base 20, the back face bottom flange 16B of the battery 10 is held between the undersurface of the back face protruding portion 30B and the support surface 18. In other words, the back wall 28B and the back face protruding portion 30B together form a holding portion that holds the back face bottom flange 16B at the rear edge portion of the support surface 18. In this structure, the undersurface of the back face protruding portion 30B serves as a holding face.

The right side face protruding portion 30R extends in the forward-rearward direction along an inner wall face of the right side wall 28R. The right side face protruding portion 30R may be disposed along the entire length of the right side wall 28R or along a portion of the right side wall 28R. The right side face protruding portion 30R includes an undersurface facing the support surface 18. When the battery 10 is mounted on the carrier base 20, the right side face bottom flange 16R of the battery 10 is held between the undersurface of the right side face protruding portion 30R and the support surface 18. In other words, the right side wall 28R and the right side face protruding portion 30R together form a holding portion that holds the right side face bottom flange 16R at the right side edge portion of the support surface 18. In this structure, the undersurface of the right side face protruding portion 30R serves as a holding face.

The left side wall 28L includes a seat 32 protruding outward from the left side wall 28L. The battery clamp 22 is fixed to the seat 32 by means of a bolt 34. This fixing position; that is, the position of the bolt 34, is located further backward with respect to the front face 14F and also further leftward with respect to the left side face 14L. The battery clamp 22 is fixed in a corner formed by the front edge and the left side edge of the support surface 18.

Figure 3:
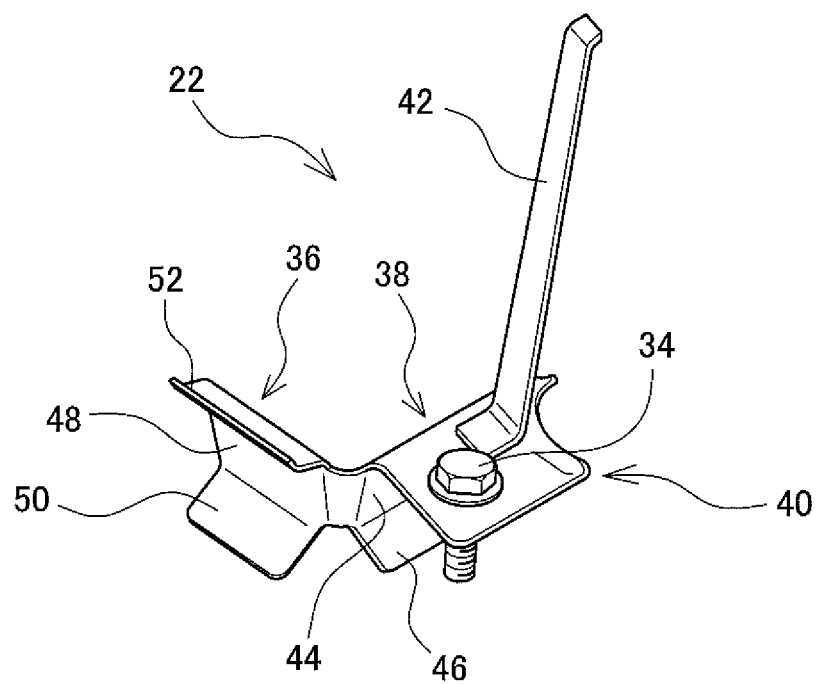
FIG. 3 is a perspective view of a battery clamp.

FIG. 3 illustrates the battery clamp 22. The battery clamp 22 includes a front locking part 36 configured to be located in front of the front face 14F of the battery 10 when the battery clamp 22 is fixed to the carrier base 20, a side locking part 38 configured to be located beside the left side face 14L of the battery 10, and a fixing piece 40 configured to be located on the seat 32 of the carrier base 20. The front locking part 36 locks the front face bottom flange 16F, and the side locking part 38 locks the left side face bottom flange 16L. The fixing piece 40 is fixed on the seat 32 of the carrier base 20 by means of the bolt 34. The back face protruding portion 30B and the right side face protruding portion 30R, and the front locking part 36 and the side locking part 38 together restrict the bottom flanges 16 to hold the battery 10 in the battery carrier 12. A support arm 42 is joined to the fixing piece 40. The support atm 42 is used to align the battery clamp 22 during mounting of the battery clamp 22. More specifically, after placing the battery 10 on the carrier base 20, the operator holds the upper end of the support arm 42 and moves the battery clamp 22 to align the hole in the fixing piece 40 with a nut formed in the seat 32, and then tightens the bolt 34.

The side locking part 38 includes a plate-like side facing portion 44 facing the left side face 14L of the battery 10 and a plate-like side pressing portion 46 extending diagonally downward from the lower edge of the side facing portion 44. The side pressing portion 46 extends along the top face of the left side face bottom flange 16L of the battery 10 and is in contact with this top face to press the left side face bottom flange 16L downward toward the support surface 18. The fixing piece 40 extends leftward from the upper edge of the side facing portion 44.

The front locking part 36 includes a plate-like front facing portion 48 facing the front face 14F of the battery 10 and a plate-like front pressing portion 50 extending diagonally downward from the lower edge of the front facing portion 48. The front facing portion 48 is continuous with the side facing portion 44 so that they form an L shape when viewed in a plan view. The front facing portion 48 and the side facing portion 44 have substantially the same height in the upward-downward direction and are continuous with each other while maintaining this height. The front pressing portion 50 extends along the top face of the front face bottom flange 16F of the battery 10 and is in contact with this top face to press the front face bottom flange 16F down toward the support surface 18. The front facing portion 48 includes a reinforcement flange 52 on its upper edge.

The front facing portion 48 and the side facing portion 44 are continuous with each other; whereas the front pressing portion 50 and the side pressing portion 46 are not directly continuous with each other. This structure facilitates production of the battery clamp 22 by sheet metal processing. The front locking part 36, the side locking part 38, and the fixing piece 40 may be produced from a single piece of sheet metal through a plurality of press molding processes. The front pressing portion 50 and the side pressing portion 46, which are separated from each other, have bending portions in substantially straight lines, which facilitates press machining. After the press molding, the support arm 42 is further joined by welding, for example.

Figure 4:
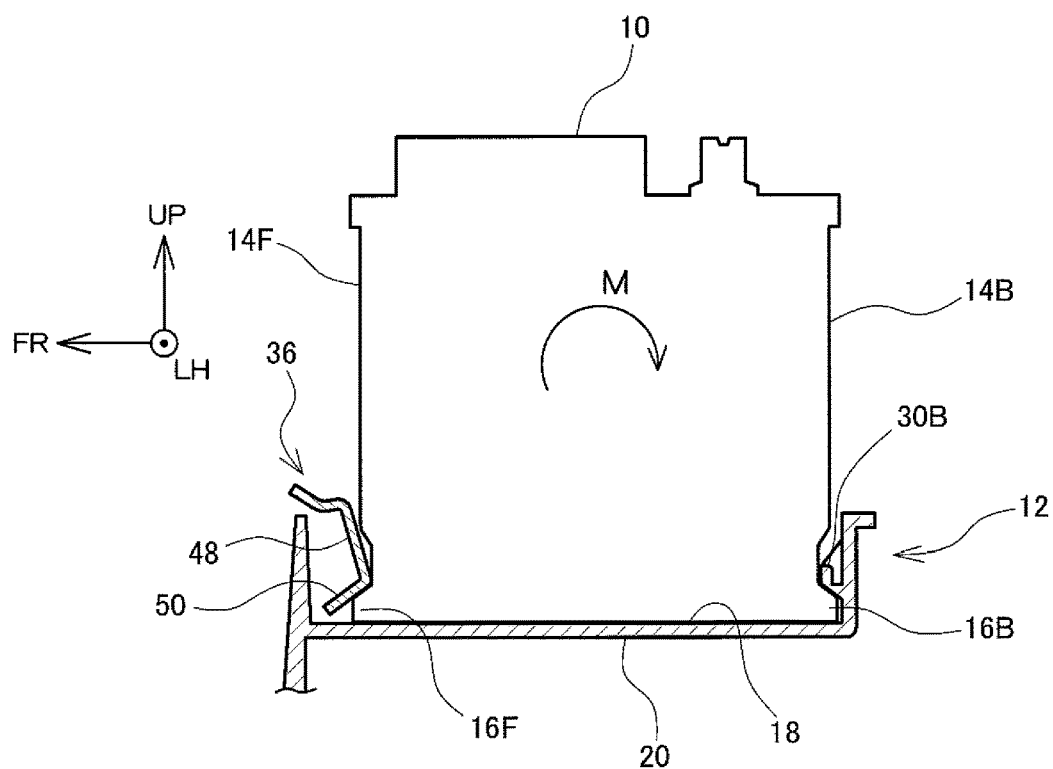
FIG. 4 is a cross sectional view of the battery and the battery carrier.

FIG. 4 is a cross sectional view of the battery 10 and the battery carrier 12 in the direction orthogonal to the right-left direction of the vehicle, and particularly a cross sectional view across the front locking part 36. As illustrated in FIG. 4, the front face bottom flange 16F and the back face bottom flange 16B each have a top surface which is downwardly sloped outward. The right side face bottom flange 16R and the left side face bottom flange 16L each similarly have a top surface which is downwardly sloped outward. The back face protruding portion 30B corresponding to the back face bottom flange 16B has an undersurface which is sloped along the top face of the back face bottom flange 16B. The back face bottom flange 16B is disposed between and held by the support surface 18 and the back face protruding portion 30B. Although not shown, the right side face protruding portion 30R similarly has an undersurface which is sloped along the right side face bottom flange 16R, and the right side face bottom flange 16R is disposed between and held by the support surface 18 and the right side face protruding portion 30R.

The front pressing portion 50 of the front locking part 36 extends along the sloped top face of the front face bottom flange 16F, and is disposed in an inclined manner. Although not shown, the side pressing portion 46 of the side locking part 38 similarly extends along the sloped top face of the left side face bottom flange 16L and is disposed in an inclined manner.

Tightening the bolt 34 causes the front pressing portion 48 and the side pressing portion 46 to press the front face bottom flange 16F and the left side face bottom flange 16L, respectively. As the top surfaces of these flanges are sloped, this pressing force also works in the direction along the support surface 18 and presses the battery 10 toward the back wall 28B and the right side wall 28R. This brings the top surface of the back face bottom flange 16B and the undersurface of the back face protruding portion 30B into intimate contact with each other, and also brings the top surface of the right side face bottom flange 16R and the undersurface of the right side face protruding portion 30R into intimate contact with each other, so that the back face bottom flange 16B and the right side face bottom flange 16R are held without looseness.

The front facing portion 48 is tilted forward and is spaced from the front face 14F of the battery 10. The side facing portion 44 is similarly tilted leftward and is spaced from the left side face 14L of the battery 10. The front facing portion 48 and the side facing portion 44, which are not in contact with the front face 14F and the left side face 14L of the battery 10, respectively, apply no unexpected force to the front face 14F and the left side face 14L, respectively.

In a rear crash, while the battery carrier 12 moves forward with the vehicle body, the battery 10 attempts to remain in the current position because of inertia. As the battery 10 is held by the battery carrier 12 at the bottom portion, the forward movement of the battery carrier 12 generates moment M exerted on the battery 10 to cause the battery 10 to rotate clockwise in FIG. 4 around its rear edge portion. This moment M works to cause the battery 10 to tilt rearward and cause the front edge, such as the front face bottom flange 16F, of the battery 10 to lift upward. This force is further transmitted to the front locking part 36 of the battery clamp 22. The battery clamp 22, which is fixed, by means of the bolt 34, to the position further backward from the front face 14F of the battery 10 and beside the left side face 14L of the battery 10, rotates clockwise in FIG. 4 about this fixing point. This rotation would further cause the front locking part 36 and the front facing portion 48 thereof to rotate clockwise.

Figure 5:
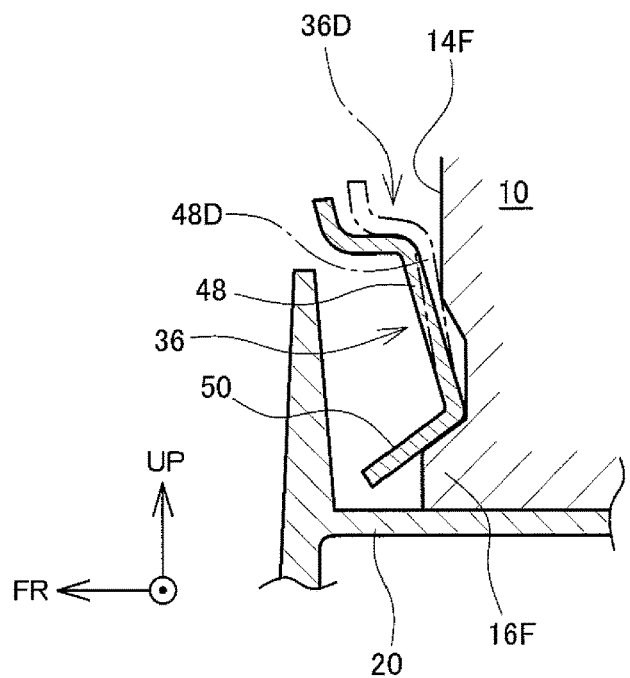
FIG. 5 is a diagram illustrating a motion of a front locking part of the battery clamp in a rear crash.

FIG. 5 is a diagram for explaining a relative motion of the front locking part 36 with respect to the battery 10 in a rear crash. The front locking part 36 is in the position indicated by a solid line before the crash, that is, in the normal state, where the front facing portion 48 is inclined forward and is spaced from the front face 14F of the battery 10. In a rear crash, the front locking part 36, upon receiving the upward force from the front face bottom flange 16F, is lifted and rotates clockwise to come into contact with the front face 14F of the battery 10. At this time, the front locking part 36 is at the relative position indicated by a dashed and single-dotted line in FIG. 5 as the front locking part 36D, with respect to the battery 10. As illustrated, the front facing portion 48D is in contact with the front face 14F of the battery 10. Thus, the front locking part 36D contacts the battery 10 not only with the front pressing portion 50 but also with the front facing portion 48D, to hold the battery 10 more reliably and prevent the battery 10 from being removed from the battery carrier 10.

In a rear crash, the front locking part 36 receives substantially the upward force from the front face bottom flange 16F. The direction of this force intersects the plate face of the front pressing portion 50 and is also substantially within the plate face of the front facing portion 48. The front locking part 36 including the front facing portion 48 in addition to the front pressing portion 50 therefore has higher rigidity against the force received in a rear crash than the front locking part 36 including only the front pressing portion 50. This structure reduces deformation of the front locking part 36, and holds the battery 10 more reliably to thereby prevent removal of the battery 10.

Further, the side locking part 38 receives a force along the direction within the plate face of the side facing portion 44, and therefore has high rigidity against this force. In particular, the front facing portion 48 and the side facing portion 44, which are continuous with each other while maintaining the same dimension in the vertical direction, secure rigidity in the connecting portion and regulate the relative movement of the front locking part 36 with respect to the side locking part 38 to thereby prevent deformation of the battery clamp 22. This structure holds the battery 10 more reliably to thereby prevent removal of the battery 10.

While in the above example, the battery carrier 12 includes the battery clamp 22 disposed in the front-left corner of the battery 10 to fasten the battery 10, the present disclosure is not limited to this example. For example, a battery carrier having a symmetrical configuration with respect to the battery carrier 12, may include the battery clamp in the front-right corner of the battery 10. Further, the front facing portion 48 of the battery clamp 22 may be in contact with the front face 14F of the battery 10 during normal operation; that is, before a crash.

REFERENCE SIGNS LIST 10 battery, 12 battery carrier, 14F front face, 14B back face, 14R right side face (first side face), 14L left side face (second side face), 16 bottom flange, 16F front face bottom flange, 16B back face bottom flange, 16R right side face bottom flange, 16L left side face bottom flange, 18 support surface, 20 carrier base, 22 battery clamp, 24 attachment leg, 26 bottom plate, 28 surrounding wall, 28F front wall, 28B back wall (holding portion), 28R right side wall (holding portion), 28L left side wall, 30B back face protruding portion (holding portion), 30R right side face protruding (holding portion), 32 seat, 34 bolt, 36 front locking part, 38 side locking part, 40 fixing piece, 42 support arm, 44 side facing portion, 46 side pressing portion, 48 front facing portion, 50 front pressing portion, 52 reinforcing flange.

The invention claimed is:

1. A battery carrier for holding a battery, for use in mounting the battery in a vehicle, the battery having a rectangular parallelepiped shape and comprising bottom flanges on bottom portions of a front face, a back face, a first side face, and a second side face, respectively, the battery carrier comprising:

a carrier base having a support surface of a rectangular shape on which the battery is placed, the carrier base comprising holding portions in a rear edge portion and a first side edge portion of the support surface, respectively, the holding portions comprising holding faces facing the support surface, the holding faces holding the bottom flanges on the back face and the first side face, respectively, between the holding faces and the support surface; and a battery clamp disposed in a corner formed between a front edge portion and a second side edge portion of the support surface of the carrier base, the battery clamp being fixed on the carrier base at a position further backward from the front face of the battery and beside the second side face of the battery, the battery clamp comprising a front locking part located in front of the front face of the battery to lock the bottom flange on the front face, and a side locking part located beside the second side face of the battery to lock the bottom flange on the second side face, the front locking part comprising a plate-like front facing portion facing the front face of the battery and a plate-like front pressing portion extending from a lower edge of the front facing portion along a top face of the bottom flange on the front face to contact the top surface of the bottom flange on the front face.

2. The battery carrier according to claim 1, wherein the side locking part comprises a plate-like side facing portion facing the second side face of the battery and a plate-like side pressing portion extending from a lower edge of the side facing portion along a top face of the bottom flange on the second side face to contact the top face of the bottom flange on the second side face, and the front facing portion and the side facing portion are connected in an L shape.

3. The battery carrier according to claim 2, wherein the front pressing portion and the side pressing portion are separated from each other.

4. The battery carrier according to claim 1, wherein the front facing portion is spaced from the front face of the battery during a normal operation, and is tilted rearward with rearward tilt of the battery in a rear crash to come into contact with the front face of the battery.

* * * * *